(12) United States Patent
Nakamura

(10) Patent No.: US 7,324,330 B2
(45) Date of Patent: Jan. 29, 2008

(54) CAPACITOR ELEMENT FOR SOLID ELECTROLYTIC CAPACITOR AND METHOD OF MAKING THE SAME

(75) Inventor: Shinji Nakamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/376,653

(22) Filed: Mar. 15, 2006

(65) Prior Publication Data

US 2006/0211193 A1    Sep. 21, 2006

(30) Foreign Application Priority Data

Mar. 17, 2005    (JP) ............................. 2005-076959

(51) Int. Cl.
*H01G 9/04* (2006.01)
*H01G 9/145* (2006.01)
*H01G 4/228* (2006.01)

(52) U.S. Cl. ..................... 361/528; 361/540; 29/25.03
(58) Field of Classification Search ................. 361/528, 361/529, 533, 540, 538; 29/25.03
See application file for complete search history.

(56) References Cited

U.S. PATENT DOCUMENTS

| 4,235,629 | A | * | 11/1980 | Marsh et al. ................. 419/32 |
| 5,608,601 | A |   | 3/1997  | Kuriyama |
| 5,818,687 | A |   | 10/1998 | Shimojima |
| 6,269,536 | B1| * | 8/2001  | Balliett ........................ 29/825 |
| 6,594,141 | B2| * | 7/2003  | Takada ........................ 361/523 |

FOREIGN PATENT DOCUMENTS

| JP | 7-74062  | 3/1995 |
| JP | 9-223644 | 8/1997 |

* cited by examiner

*Primary Examiner*—Eric Thomas
(74) *Attorney, Agent, or Firm*—Hamre, Schumann, Mueller & Larson, P.C.

(57) ABSTRACT

The capacitor element includes a porous chip body and an anode wire having an end portion embedded in the chip body. The chip body includes a surface provided with a dielectric film which in turn is formed with a solid electrolyte layer thereon. Further, the solid electrolyte layer is laminated with a cathode film. The chip body is formed by sintering a mixture of valve metal powder and a sintering inhibitor added as impurities. Similarly, the anode wire is made of valve metal containing a sintering inhibitor.

2 Claims, 2 Drawing Sheets

CAPACITOR ELEMENT FOR SOLID ELECTROLYTIC CAPACITOR AND METHOD OF MAKING THE SAME

BACKGROUND OF THE INVENTION

1. Field of the Invention

The present invention relates to a solid electrolytic capacitor utilizing valve metal such as tantalum or niobium and particularly relates to a capacitor element to be incorporated in the capacitor. The present invention also relates to a method of making such a capacitor element.

2. Description of the Related Art

Conventionally, as disclosed in JP-A-H7-74062, for example, such a kind of capacitor elements is manufactured as follows.

First, valve metal powder such as tantalum powder and an anode wire made of valve metal are prepared. Then, the valve metal powder is compacted into a porous chip body in a manner such that an end portion of the anode wire is embedded in the chip body. Next, the chip body is sintered with a high temperature in a vacuum to join particles of the valve metal powder.

Subsequently, a dielectric film is formed on particle surfaces of the valve metal powder constituting the chip body, and then a solid electrolyte layer is formed on the dielectric film, and finally a cathode film is formed on the solid electrolyte layer, whereby a capacitor element is provided.

Similarly, JP-A-H9-223644 discloses another example of a manufacturing method of a capacitor element.

The above-described sintered chip body is required to be porous, in other words, to be formed to contain as many tiny holes as possible. For that purpose, before the sintering process, valve metal powder to form a chip body is prepared with a sintering inhibitor preliminarily added thereto as impurities. The sintering inhibitor contains, for example, at least one of the following: phosphorus, oxygen, carbon, nitrogen, hydrogen, iron, nickel, and silicon.

Employing such a sintering inhibitor can cause some disadvantages due to diffusion which occurs during the sintering process. The diffusion carries the sintering inhibitor into the anode wire at the above-described end portion which is covered by the chip body.

The diffused sintering inhibitor may concentrate at the covered end portion and produce segregation thereat, making the root portion of the anode wire extremely brittle. As a result, the anode wire may be formed likely to be folded or broken easily. This can involve a rise in rejection rate in manufacturing processes or incident rate of electrical open-circuiting at the anode wire during use of the solid electrolytic capacitor device.

SUMMARY OF THE INVENTION

It is an object of the present invention to provide a capacitor element which is capable of preventing the anode wire from being broken easily as described above. Additionally, it is another object of the present invention to provide a method of making such an improved capacitor element.

According to the first aspect of the present invention, there is provided a capacitor element, which comprises a porous chip body provided by sintering a compacted body made of valve metal powder which preliminarily contains a sintering inhibitor. The capacitor element further includes an anode wire including an end portion embedded in the chip body, a dielectric film formed on the chip body, a solid electrolyte layer formed on the dielectric film, and a cathode film formed on the solid electrolyte layer. The anode wire is made of valve metal that preliminarily contains a sintering inhibitor.

According to the second aspect of the present invention, there is provided a method of making a capacitor element. The method comprises the steps of: forming an anode wire of valve metal containing a sintering inhibitor; making a porous chip body by compacting valve metal powder containing a sintering inhibitor in a manner such that an end portion of the anode wire is embedded in the chip body; sintering the chip body; forming a dielectric film on the chip body; forming a solid electrolyte layer on the dielectric film; and forming a cathode film on the solid electrolyte layer.

The present invention provides an anode wire made of valve metal preliminarily containing a sintering inhibitor as impurities as in the chip body. Thus, the sintering inhibitor contained in the chip body is prevented from traveling diffusionally into the anode wire, eliminating the occurrence of segregation due to concentration of the sintering inhibitor at the covered end portion of the anode wire. As a result, the present invention makes it possible to prevent the root portion of the anode wire from being formed brittle.

DETAILED DESCRIPTION OF THE PREFERRED EMBODIMENT

A preferred embodiment of the present invention will be described below with reference to the accompanying drawings.

Figure 1:
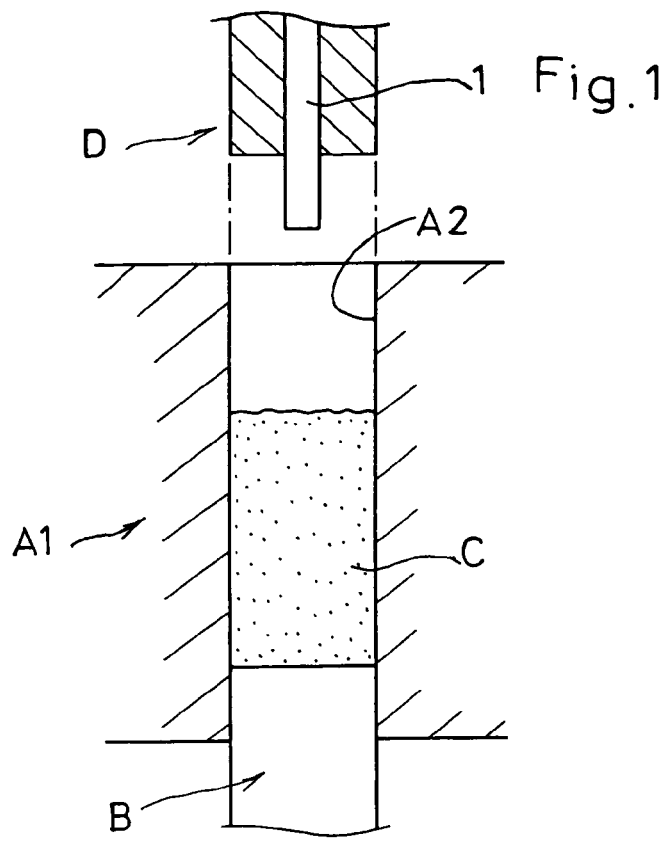
FIG. 1 is a sectional view showing a process in the method of making a capacitor element according to the present invention.

FIG. 1 illustrates the first process in the method of making a capacitor element according to the present invention. A press die A1 includes a compacting room A2 which has a lower side closed by a lower die member B1. Valve metal powder C, such as tantalum, is preliminarily mixed with a proper amount of sintering inhibitor as impurities and then put in the compacting room A2. The sintering inhibitor contains, for example, at least one of the following: phosphorus, oxygen, carbon, nitrogen, hydrogen, iron, nickel, and silicon.

An upper die member D holds an anode wire 1. The wire 1 is formed as follows. First, valve metal powder is prepared as material for the anode wire 1, and then is preliminarily mixed with a proper amount of sintering inhibitor as impurities. The sintering inhibitor contains, for example, at least one of the following: phosphorus, oxygen, carbon, nitrogen, hydrogen, iron, nickel, and silicon. Next, the mixture powder is compacted and then sintered. Subsequently, the sintered body is molten or forged to produce an ingot of tantalum. Finally, the ingot is stretched to obtain the anode wire 1.

Figure 2:
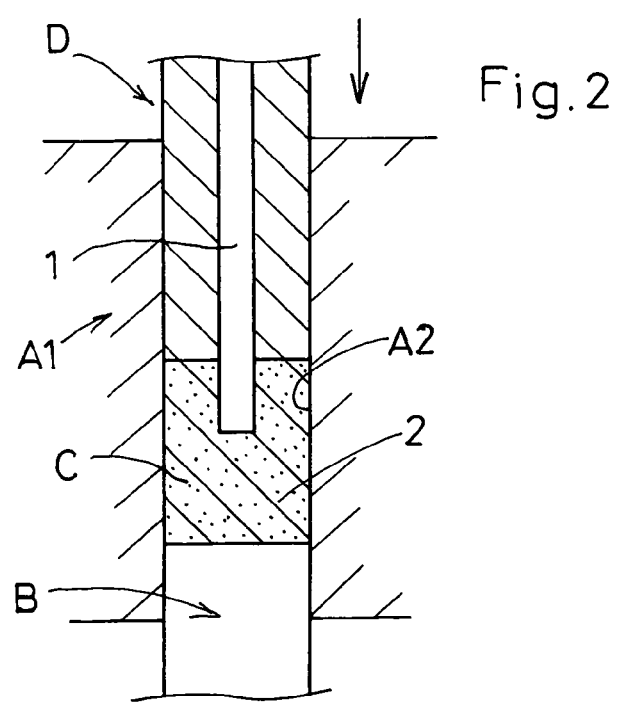
FIG. 2 is a sectional view showing another process following the process illustrated in FIG. 1.

FIG. 2 illustrates the subsequent process following the process illustrated in FIG. 1. With the anode wire 1 supported, the upper die member D compacts the valve metal powder C to form a chip body 2 which is covering an end portion of the anode wire 1.

Figure 3:
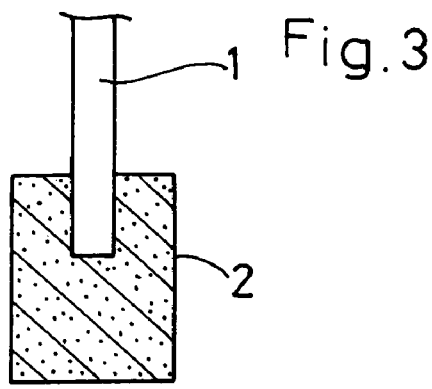
FIG. 3 is a sectional view showing a chip body after the sintering process.

The chip body 2 compacted with the anode wire 1 is then taken out of the compacting room A2 and then put into a vacuum of a heating furnace. Heated at a high temperature, the chip body is sintered to join particles of the valve metal powder C, producing a porous sintered chip body 2 shown in FIG. 3.

The sintering inhibitor contained in the anode wire 1 prevents the sintering inhibitor contained in the chip body 2 from traveling diffusionally into the anode wire 1 during the sintering process. Thus, it is possible to eliminates the occurrence of segregation due to concentration of the sintering inhibitor at the covered end portion of the anode wire 1.

Figure 4:
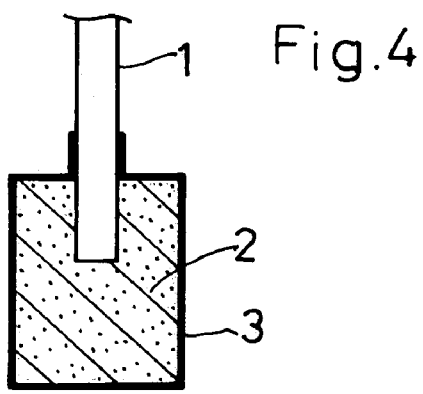
FIG. 4 is a sectional view showing a chip body provided with a dielectric film.

Subsequently, as shown in FIG. 4, a highly insulating dielectric film 3 of e.g. tantalum pentoxide is formed on particle surfaces of the valve metal powder constituting the chip body 2 through anodizing and so on.

Figure 5:
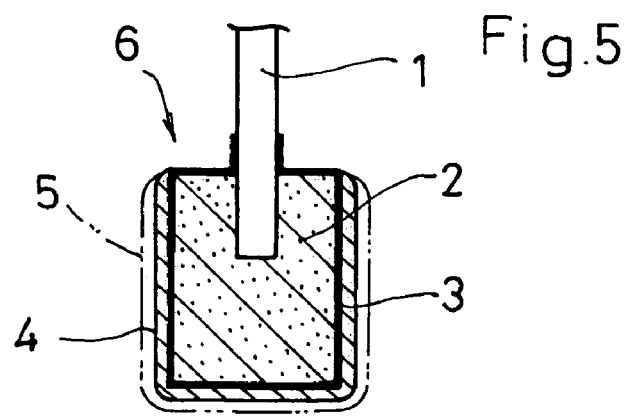
FIG. 5 is a sectional view showing a chip body provided with a solid electrolyte layer and a cathode film.

Then, as shown in FIG. 5, a solid electrolyte layer 4 of e.g. manganese dioxide is formed on the dielectric film 3.

Finally, on the solid electrolyte layer 4 is formed a cathode 5, which consists of a graphite layer as the underlying layer and a metal layer of e.g. copper or nickel, whereby a capacitor element 1 is obtained.

The invention claimed is:

1. A capacitor element comprising:
   a porous chip body provided by sintering a compacted body made of valve metal powder preliminarily containing a sintering inhibitor;
   an anode wire including an end portion embedded in the chip body;
   a dielectric film formed on the chip body;
   a solid electrolyte layer formed on the dielectric film; and
   a cathode film formed on the solid electrolyte layer;
   wherein the anode wire is made of valve metal preliminarily containing a sintering inhibitor; and
   wherein the sintering inhibitor for both of the chip body and the anode wire comprises phosphorus.

2. A method of making a capacitor element, the method comprising the steps of:
   forming an anode wire of valve metal containing a sintering inhibitor;
   making a porous chip body by compacting valve metal powder containing a sintering inhibitor in a manner such that an end portion of the anode wire is embedded in the chip body;
   sintering the chip body;
   forming a dielectric film on the chip body;
   forming a solid electrolyte layer on the dielectric film; and
   forming a cathode film on the solid electrolyte layer;
   wherein the sintering inhibitor for both of the chip body and the anode wire comprises phosphorus.

* * * * *